United States Patent
Morel-Fourrier et al.

(10) Patent No.: US 10,477,539 B2
(45) Date of Patent: Nov. 12, 2019

(54) DATA TRANSMISSION METHOD WITH IMPROVED ROBUSTNESS, AND A SET OF DEVICES FOR PERFORMING IT

(71) Applicant: SAFRAN ELECTRONICS & DEFENSE, Boulogne Billancourt (FR)

(72) Inventors: Laurent Morel-Fourrier, Boulogne Billancourt (FR); Mathieu Conq, Boulogne Billancourt (FR); Nicolas Geneste, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 15/120,022

(22) PCT Filed: Feb. 16, 2015

(86) PCT No.: PCT/EP2015/053239
§ 371 (c)(1),
(2) Date: Aug. 18, 2016

(87) PCT Pub. No.: WO2015/124538
PCT Pub. Date: Aug. 27, 2015

(65) Prior Publication Data
US 2017/0070989 A1    Mar. 9, 2017

Related U.S. Application Data

(60) Provisional application No. 61/942,862, filed on Feb. 21, 2014.

(30) Foreign Application Priority Data

Aug. 14, 2014  (FR) ..................... 14 57839

(51) Int. Cl.
H04W 72/04    (2009.01)
H04L 1/08     (2006.01)
(Continued)

(52) U.S. Cl.
CPC ....... *H04W 72/0446* (2013.01); *H04L 1/0061* (2013.01); *H04L 1/08* (2013.01); *H04L 12/40* (2013.01); *H04L 2012/4028* (2013.01)

(58) Field of Classification Search
None
See application file for complete search history.

(56) References Cited

U.S. PATENT DOCUMENTS 5,241,548 A     8/1993  Dillon et al.
5,455,830 A *  10/1995  Gregg ................. G06F 15/17
                                                   370/507

(Continued)

FOREIGN PATENT DOCUMENTS

EP    0797326 A2    9/1997
EP    0797326 A3    1/2000
(Continued)

Primary Examiner — Gregory B Sefcheck
(74) Attorney, Agent, or Firm — Muncy, Geissler, Olds & Lowe, P.C.

(57) ABSTRACT

A method of transmitting data between an electronic transmitter device and an electronic receiver device connected together by a data link, the method comprising the steps of: sending the data in the form of at least three identical frames sent in succession and each associated with respective checkdata calculated on the frame in question; and the electronic receiver device verifying the validity of the received frames as they are being received and making the first valid frame available for processing while ignoring the others.

8 Claims, 1 Drawing Sheet

(51) Int. Cl.
*H04L 12/40* (2006.01)
*H04L 1/00* (2006.01)

(56) References Cited

U.S. PATENT DOCUMENTS

| | | | | |
|---|---|---|---|---|
| 5,673,291 A * | 9/1997 | Dent | | H03M 13/2721 |
| | | | | 329/304 |
| 6,438,723 B1 * | 8/2002 | Kalliojarvi | | H04L 1/1816 |
| | | | | 714/751 |
| 6,697,441 B1 * | 2/2004 | Bottomley | | H03M 13/2957 |
| | | | | 375/324 |
| 7,061,866 B2 * | 6/2006 | Connor | | H04L 47/10 |
| | | | | 370/229 |
| 7,234,095 B2 * | 6/2007 | Lee | | H03M 13/09 |
| | | | | 714/751 |
| 7,379,450 B2 * | 5/2008 | Gu | | H04L 12/1818 |
| | | | | 370/261 |
| 7,388,853 B2 * | 6/2008 | Ptasinski | | H04L 1/0003 |
| | | | | 370/338 |
| 7,522,633 B2 * | 4/2009 | Ichino | | H04J 3/1617 |
| | | | | 370/401 |
| 7,539,489 B1 * | 5/2009 | Alexander | | H04W 24/06 |
| | | | | 370/241 |
| 7,738,441 B2 * | 6/2010 | Nishibayashi | | H04L 1/1614 |
| | | | | 370/349 |
| 7,849,138 B2 * | 12/2010 | Gu | | H04L 12/1818 |
| | | | | 370/261 |
| 7,903,670 B2 * | 3/2011 | Ha | | H04L 12/2602 |
| | | | | 370/401 |
| 7,916,746 B2 * | 3/2011 | Yonge, III | | H04B 3/54 |
| | | | | 370/445 |
| 8,233,463 B2 * | 7/2012 | Yang | | H04W 84/18 |
| | | | | 370/338 |
| 8,238,247 B2 * | 8/2012 | Wu | | H04L 1/1812 |
| | | | | 370/235 |
| 8,331,386 B2 * | 12/2012 | Carmon | | H04L 1/0061 |
| | | | | 370/278 |
| 8,422,411 B2 * | 4/2013 | Sudarshan | | H04B 7/2656 |
| | | | | 370/281 |
| 8,458,551 B2 * | 6/2013 | Owaki | | H04L 1/0006 |
| | | | | 370/235 |
| 8,566,669 B2 * | 10/2013 | Schuette | | G06F 11/1048 |
| | | | | 711/1 |
| 8,588,347 B1 * | 11/2013 | Petrovic | | H04L 1/08 |
| | | | | 375/260 |
| 8,780,937 B2 * | 7/2014 | Classon | | H04B 7/2656 |
| | | | | 370/470 |
| 8,855,219 B2 * | 10/2014 | Gao | | H04L 1/003 |
| | | | | 375/259 |
| 9,094,419 B2 * | 7/2015 | Coffee | | H04N 1/00214 |
| 9,178,757 B2 * | 11/2015 | Glosser, Jr. | | G06F 11/1625 |
| 9,374,194 B2 * | 6/2016 | Glosser, Jr. | | H03M 13/05 |
| 9,407,481 B1 * | 8/2016 | Petrovic | | H04L 1/08 |
| 2002/0095635 A1 | 7/2002 | Wager et al. | | |
| 2002/0168033 A1 * | 11/2002 | Suzuki | | H03M 13/2975 |
| | | | | 375/341 |
| 2006/0251011 A1 * | 11/2006 | Ramakrishnan | | H04L 1/0007 |
| | | | | 370/328 |
| 2010/0095181 A1 * | 4/2010 | Ma | | H04L 1/1819 |
| | | | | 714/748 |
| 2011/0070821 A1 | 3/2011 | Chun et al. | | |
| 2012/0314599 A1 * | 12/2012 | Vilke | | H04L 41/142 |
| | | | | 370/252 |
| 2017/0070989 A1 * | 3/2017 | Morel-Fourrier | | H04L 1/0061 |

FOREIGN PATENT DOCUMENTS

| | | |
|---|---|---|
| EP | 2453604 A2 | 5/2012 |
| EP | 2453604 A3 | 11/2014 |

\* cited by examiner

DATA TRANSMISSION METHOD WITH IMPROVED ROBUSTNESS, AND A SET OF DEVICES FOR PERFORMING IT

BACKGROUND OF THE INVENTION

Field of the Invention

The invention relates to safely transmitting data between electronic devices. By way of example, the electronic devices may be computers used for controlling an aircraft.

Brief Discussion of the Related Art

In an aircraft, the or each engine is controlled by an engine control unit (ECU) comprising a plurality of electronic data processor devices such as computers that are connected to one another by serial links over which data frames are exchanged. These serial links are subjected to disturbances, e.g. as a result of electric and/or electromagnetic fields and of lightning strikes, which disturbances can change the data being transmitted over the link. In spite of that, it is necessary to avoid control of the engines being changed under such circumstances.

BRIEF SUMMARY OF THE INVENTION

An object of the invention is to improve the reliability of data transmission.

To this end, the invention provides a method of transmitting data between an electronic transmitter device and an electronic receiver device connected together by a data link, the method comprising the steps of:

sending the data in the form of at least three identical frames sent in succession and each associated with respective checkdata calculated on the frame in question; and the electronic receiver device verifying the validity of the received frames as they are being received and making the first valid frame available for processing while ignoring the others.

Causing the frames to occupy a longer period of time limits the risk of any one disturbance changing the transmitted data. In addition, the presence of the checkdata makes it easier for the receiver device to detect corrupted frames and to accelerate data processing.

Advantageously, the method includes the step, when none of the received frames is valid, of reconstituting a frame by majority voting on the basis of the three received frames.

Comparing the data of the received frames makes it simper to reconstitute a frame, e.g. by using a majority voting algorithm, thus eliminating errors that result from a disturbance.

Under such circumstances, and advantageously, the method includes the steps of calculating checkdata on the reconstituted frame and of making the reconstituted frame available for processing if it is valid.

The robustness of transmission is further improved.

Preferably, the frame is reconstituted progressively while receiving the data of the third frame.

Memory requirements are thus limited and processing speed is enhanced.

Under such circumstances, and preferably, the receiver electronic device includes both at least one first buffer memory zone and at least one second buffer memory zone, and the method further comprises:

storing the first received frame and its checkdata in the first buffer memory zone;

if the first received frame is not valid, storing the second received frame and its checkdata in the second buffer memory zone;

if the second received frame is not valid, storing the third received frame and its checkdata in the first buffer memory zone; and storing the reconstituted frame and its checkdata in the second buffer zone.

This limits buffer memory requirements.

Advantageously, the data link is liable to be subjected to a disturbance having a predetermined theoretical maximum duration, and the frames are spaced apart by an interval duration longer than the predetermined theoretical maximum duration.

The interval duration is measured from the beginning of transmission of one frame to the beginning of transmission of the following frame. Thus, the same disturbance cannot change the same bit in two successive frames.

Also advantageously, the data link is liable to be subjected to two consecutive disturbances that are spaced apart by a predetermined theoretical minimum duration, and each frame has a duration shorter than the predetermined theoretical minimum duration.

The risk of a frame being changed by two successive disturbances is thus limited.

The invention also provides a set of data processor devices comprising at least one transmitter electronic device and at least one receiver electronic device connected together by a data link, the electronic devices being arranged to implement the method of the invention.

Other characteristics and advantages of the invention appear on reading the following description of a particular, non-limiting implementation of the invention.

BRIEF DESCRIPTION OF THE DRAWINGS

Reference is made to the accompanying drawings, in which.

DETAILED DISCUSSION OF THE PREFERRED EMBODIMENTS

Figure 1:
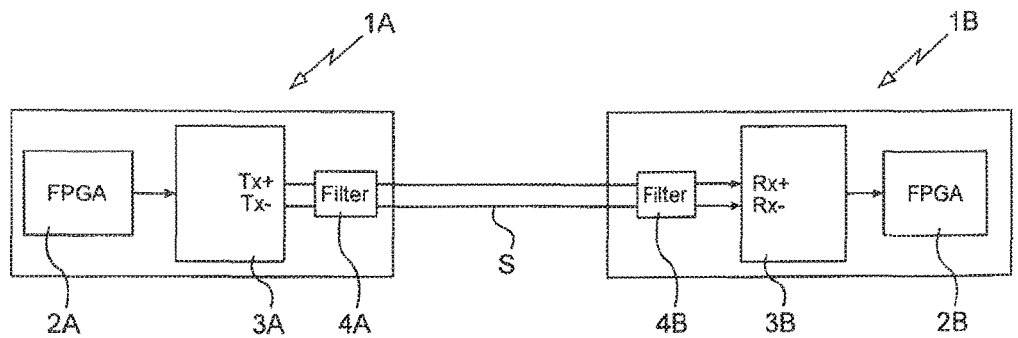
FIG. 1 is a diagrammatic view of a device implementing the invention.
Figure 2:
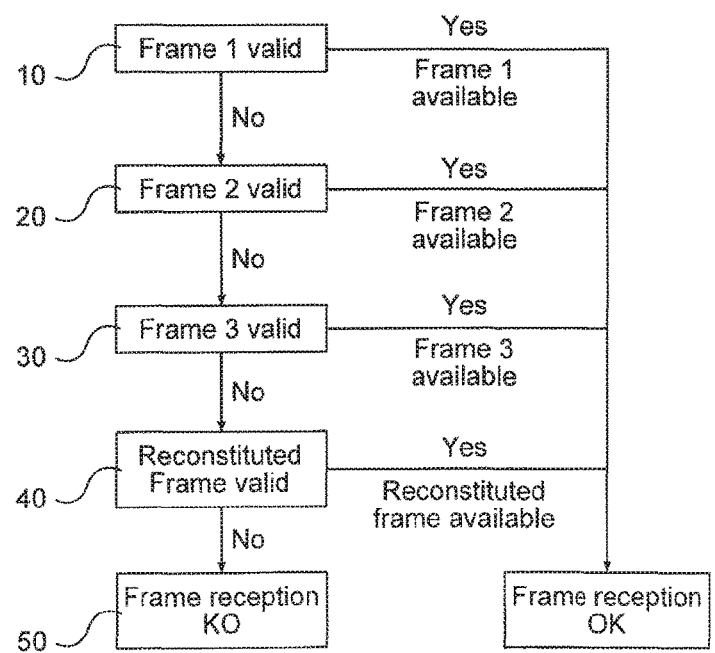
FIG. 2 is a flow chart showing the various steps of the method of the invention.

With reference to the figures, the method of the invention is implemented in apparatus comprising two electronic devices 1A and 1B, each having a processor circuit 2A, 2B such as a processor associated with random access memory (RAM) and mass storage. The RAM includes two buffer memory zones dedicated to temporary storage of the transmitted data (the buffer memory zones are referred to below as buffer memory 1 and buffer memory 2 for greater convenience and without reference to the figures). Each processor circuit 2A, 2B is connected to a communication interface 3A, 3B. The communication interfaces 3A, 3B are connected to each other via filters 4A, 4B by a serial link 5. The devices 1A, 1B may take turns acting as being transmitter and receiver. These various components are of conventional structure and they are therefore not described in greater detail.

In operation, data frames are transmitted between the electronic devices 1A, 1B in order to be processed by the processor circuits 2A, 2B. The apparatus is arranged to implement a transmission method that is based on:

at the transmitter end, time triplication such that each data frame is sent three times (frame 1, 2, 3) with respective checkdata being associated with each frame; and at the receiver end, frame correction based on the checkdata and a bitwise majority voting algorithm.

The devices 1A, 1B are arranged more precisely to implement the data transmission method comprising the steps of:

for a data frame to be transmitted, preparing at least two replica frames in order to obtain a set of three frames for transmission (this is the triplication operation);

for each frame, calculating respective checkdata and associating it with the frame;

transmitting the frames together with their checkdata in succession in time;

verifying the validity of the first received frame with its checkdata, and if successful, processing the first frame and ignoring the other frames in the same set of frames;

if the first received data frame is not valid, waiting for the next frame and verifying the validity of the second received frame using its checkdata, and if successful, processing the second frame and ignoring the other frames in the same set of frames;

if the second received frame is not valid, waiting for the next frame and comparing, on the fly and bitwise, the third received frame with the first and second received frames in order to reconstitute a frame by using a majority voting algorithm and calculating checkdata for the reconstituted frame;

verifying the validity of the third frame, and if the third received frame is valid, processing the third frame; and if the third received frame is not valid, verifying the validity of the reconstituted frame and processing the reconstituted frame if it is valid, and ignoring it if the reconstituted frame is not valid.

In this example, the checkdata is the result of a cyclic redundancy check (CRC), e.g. a checksum, that serves to verify the integrity of the data of the frame. This type of verification is itself known.

At the receiver end, the frames 1 and 2 are stored in buffer memories. The frame 3 is used, if necessary, to perform error correction on the fly. More precisely, the frame 3 is compared bitwise and in real time with the previously received and stored frames 1 and 2: this makes it possible in real time to reconstitute a corrected frame that is stored in the buffer memory.

Since each frame is associated with respective checkdata, the processor circuit of the receiver device can verify the validity of each received frame. Each frame is thus verified with reference to its own checkdata. The frame that is used for processing is the first frame to be received for which validity is confirmed by its checkdata.

Consequently, during reception:

the first received frame of confirmed validity is made available for processing; and the following frames in the set of frames are ignored.

If the frame 1 (first received frame) is validated (step 10), the frame 1 is made accessible for the processing that is to be performed and both the frames 2 (second received frame) and 3 (third received frame) are ignored.

If the frame 1 is not valid, but the frame 2 is valid (step 20), then the frame 2 is made accessible and the frame 3 is ignored.

If neither frame 1 nor frame 2 is valid, the receiver device performs error detection on frame 3. Each word of frame 3 is compared (bitwise) with the received words of the frames 1 and 2. The majority bits are stored and form a reconstituted frame.

If frame 3 is valid (step 30), then frame 3 is made available for processing and frames 1 and 2 are ignored.

If frame 3 is not correct, the receiver verifies the checkdata of reconstituted frame 3.

If the checkdata is correct (step 40), then the reconstituted frame is made available.

If the checkdata is not correct, then data transmission is considered as having failed (step 50).

An example of received frames and of a reconstituted frame is given in the table below. Although the received data frames 1, 2, and 3 ought to be identical (since they were identical before being transmitted), it is clear that they are different because of errors introduced during transmission. CRC1, CRC2, CRC3, and CRC4 constitute the checkdata of the respective frames 1, 2, and 3, and of the reconstituted frame.

TABLE 1

| Frame 1 | Frame 2 | Frame 3 | Reconstituted frame |
|---|---|---|---|
| 11011000 | 10010000 | 10011000 | 10011000 |
| 00110010 | 00110010 | 00110010 | 00110010 |
| 11110111 | 11110111 | 11110111 | 11110111 |
| 11000001 | 11000101 | 11001001 | 11000001 |
| 10011000 | 10011000 | 10011000 | 10011000 |
| 11101111 | 11111111 | 11111111 | 11111111 |
| 00110010 | 00110010 | 00110010 | 00110010 |
| 00000000 | 10011000 | 10011000 | 10011000 |
| 00110010 | 00110010 | 00110010 | 00110010 |
| 10011000 | 10011000 | 10011000 | 10011000 |
| 11011000 | 10010000 | 10011010 | 10011010 |
| 00110010 | 00110010 | 00110010 | 00110010 |
| 10011000 | 10011000 | 10011000 | 10011000 |
| CRC1 | CRC2 | CRC3 | CRC4 |

The various situations corresponding to receiving three frames are listed in Table 2 below. In this table, "OK" means that the frame is valid, "KO" means that the frame is not valid, "X" means that the frame is ignored.

TABLE 2

| Frame 1 | Frame 2 | Frame 3 | Status after correction | Algorithm |
|---|---|---|---|---|
| OK | X | X | X | Store frame 1 in buffer memory 1. If CRC1 is OK, then wait for a duration longer than the idle time (32 bits) after the end of frame 1 (frames 2 and 3 are ignored). Indicate that the data is available in buffer memory 1. |
| KO | OK | X | X | Store frame 1 in buffer memory 1. If CRC1 is KO, then store frame 2 in buffer memory 2, and if CRC2 is OK, then wait for a duration longer than the idle time after the end of frame 2 (frame 3 is ignored). Indicate that the data of buffer memory 2 is available. |

TABLE 2-continued

| Frame 1 | Frame 2 | Frame 3 | Status after correction | Algorithm |
|---------|---------|---------|-------------------------|-----------|
| KO | KO | OK | X | Store frame 1 in buffer memory 1. If CRC1 is KO, then store frame 2 in buffer memory 2, and if CRC2 is KO, then store frame 3 in buffer memory 1 while correcting buffer memory 2 on the fly. If CRC3 is OK, wait for a duration longer than the idle time after the end of frame 3. Indicate that the data of buffer memory 1 is available. |
| KO | KO | KO | OK | Store frame 1 in buffer memory 1. If CRC1 is KO, then store frame 2 in buffer memory 2, and if CRC2 is KO, then store frame 3 in buffer memory 1 and perform correction on the fly in buffer memory 2. If CRC3 is KO and if CRC4 is OK, wait for a duration longer than the idle time after the end of frame 3. Indicate that the data of buffer memory 2 is available. |
| KO | KO | KO | KO | Store frame 1 in buffer memory 1. If CRC1 is KO, then store frame 2 in buffer memory 2, and if CRC2 is KO, then store frame 3 in buffer memory 1 and perform correction on the fly in buffer memory 2. If CRC3 and CRC4 are KO, wait for a duration longer than the idle time after the end of frame 3. Indicate that the data is corrupt. |

When all of the frames have been received, there is only one situation in which the data made available for processing is erroneous: all three frames have been corrupted and, during bitwise comparison, two of the frames share bits that have been corrupted in the same way.

Table 3 lists the various possibilities when at least one transmitted frame is not received. When one or more frames is/are missing (marked "none" in the table), frame correction cannot be performed and the first correct frame to be received is used.

TABLE 3

| Frame 1 | Frame 2 | Frame 3 | Status after correction | Algorithm |
|---------|---------|---------|-------------------------|-----------|
| None | OK | X | N/A | Store frame 2 in buffer memory 1. If CRC2 is OK, wait for a duration longer than the idle time after the end of frame 2 and ignore frame 3. Indicate that the data of buffer memory 1 is available. |
| None | KO | OK | N/A | Store frame 2 in buffer memory 1. If CRC2 is KO, store frame 3 in buffer memory 2. If CRC3 is OK, wait for a duration longer than the idle time after the end of frame 3. Indicate that the data of buffer memory 2 is available. |
| None | KO | KO | N/A | Store frame 2 in buffer memory 1. If CRC2 is KO, store frame 3 in buffer memory 2. If CRC3 is KO, wait for a duration longer than the idle time after the end of frame 3. Indicate that the data is corrupt. |
| None | KO | None | N/A | Store frame 2 in buffer memory 1. If CRC2 is KO, wait for a duration longer than the idle time after the end of frame 2. Indicate that the data is corrupt. |
| None | None | OK | N/A | Store frame 3 in buffer memory 1. If CRC3 is OK, wait for a duration longer than the idle time after the end of frame 3. Indicate that the data is corrupt. |
| None | None | KO | N/A | Store frame 3 in buffer memory 1. If CRC3 is KO, wait for a duration longer than the idle time after the end of frame 3. Indicate that the data is corrupt. |
| KO | None | OK | N/A | Store frame 1 in buffer memory 1. If CRC1 is KO, store frame 3 in buffer memory 2. If CRC3 is OK, wait for a duration longer than the idle time after the end of frame 3. Indicate that the data of buffer memory 2 is available. |
| KO | None | KO | N/A | Store frame 1 in buffer memory 1. If CRC1 is KO, store frame 3 in buffer memory 2. If CRC3 is KO, wait for a duration longer than the idle time after the end of frame 3. Indicate that the data is corrupt. |
| KO | None | None | N/A | Store frame 1 in buffer memory 1. If CRC1 is KO, wait for a duration longer than the idle time after the end of frame 1. Indicate that the data is corrupt. |
| KO | KO | None | N/A | Store frame 1 in buffer memory 1. If CRC1 is KO, store frame 2 in buffer memory 2. If CRC2 is KO, wait for a duration longer than the idle time after the end of frame 2. Indicate that the data is corrupt. |

The mechanism of the invention combines a correction mechanism (triplication) with a mechanism for verifying validity in order to have good robustness. Thus, most transmission failures can be detected and corrected.

Under extreme circumstances in which correction is not possible, failure is detected and the transmission is considered as having failed.

Implementation of the invention does not involve any extra cost and requires only a relatively small amount of calculation resources.

The invention is usable for any data transmission between electronic data processor devices.

The invention claimed is:

1. A method of transmitting data between an electronic transmitter device and an electronic receiver device connected together by a data link, the method comprising the steps of:
    sending the data in the form of at least three identical frames sent in succession and each associated with respective checkdata calculated on the frame in question; and
    the electronic receiver device verifying the validity of the received frames as they are being received and making the first valid frame available for processing while ignoring the others, so that
    if the first received data frame is not valid, the electronic receiver device waits for the second frame to be received and verifies the validity of the second received frame;
    if the second received frame is not valid, the electronic receiver device waits for the third frame to be received and
    reconstitutes a frame by majority voting on the basis of the three received frames, the frame being reconstituted progressively while receiving the data of the third frame.

2. A method according to claim 1, including the steps of calculating checkdata on the reconstituted frame and of making the reconstituted frame available for processing.

3. The method according to claim 1, wherein the data link causes a disturbance having a predetermined theoretical maximum duration, wherein the frames are spaced apart by an interval duration longer than the predetermined theoretical maximum duration.

4. The method according to claim 1, wherein the data link causes two consecutive disturbances that are spaced apart by a predetermined theoretical minimum duration, and wherein each frame has a duration shorter than the predetermined theoretical minimum duration.

5. A method of transmitting data between an electronic transmitter device and an electronic receiver device connected together by a data link, the receiver electronic device including both at least one first buffer memory zone and at least one second buffer memory zone, the method comprising the steps of:
    sending the data in the form of at least three identical frames sent in succession and each associated with respective checkdata calculated on the frame in question; and
    the electronic receiver device verifying the validity of the received frames as they are being received and making the first valid frame available for processing while ignoring the others;
    when none of the two first received frames is valid, reconstituting a frame by majority voting on the basis of the three received frames, the frame being reconstituted progressively while receiving the data of the third frame;
    storing the first received frame and its checkdata in the first buffer memory zone;
    if the first received frame is not valid, waiting for the second frame to be received and storing the second received frame and its checkdata in the second buffer memory zone;
    if the second received frame is not valid, waiting for the third frame to be received and storing the third received frame and its checkdata in the first buffer memory zone; and
    storing the reconstituted frame and its checkdata in the second buffer zone.

6. A set of data processor devices comprising at least one transmitter electronic device and at least one receiver electronic device connected together by a data link, the electronic devices being arranged to implement the method according to claims 1, 2 and 4-5.

7. A method of transmitting data between an electronic transmitter device and an electronic receiver device connected together by a data link, the method comprising the steps of:
    sending the data in the form of at least three identical frames sent in succession and being spaced apart by an interval duration longer than the predetermined theoretical maximum duration, each frame being associated with respective checkdata calculated on the frame in question and having a duration shorter than the predetermined theoretical minimum duration; and
    the electronic receiver device verifying the validity of the received frames as they are being received and making the first valid frame available for processing while ignoring the others, so that
    if the first received data frame is not valid, the electronic receiver device waits for the second frame to be received and verifies the validity of the second received frame;
    if the second received frame is not valid, the electronic receiver device waits for the third frame to be received and
    reconstitutes a frame by majority voting on the basis of the three received frames, the frame being reconstituted progressively while receiving the data of the third frame,
    wherein the data link causes a disturbance having a predetermined theoretical maximum duration or two consecutive disturbances that are spaced apart by a predetermined theoretical minimum duration.

8. A method of transmitting data between an electronic transmitter device and an electronic receiver device connected together by a data link, the method comprising the steps of:
    for a data frame to be transmitted, preparing at least two replica frames in order to obtain a set of three frames for transmission;
    for each frame, calculating respective checkdata and associating it with the frame;
    transmitting the frames together with their checkdata in succession in time;
    verifying the validity of the first received frame with its checkdata, and if successful, processing the first frame and ignoring the other frames in the same set of frames;
    if the first received data frame is not valid, waiting for the second frame to be received and verifying the validity of the second received frame using its checkdata, and if successful, processing the second frame and ignoring the other frames in the same set of frames;

if the second received frame is not valid, waiting for the third frame to be received and comparing, on the fly and bitwise, the third received frame with the first and second received frames in order to reconstitute a frame and calculating checkdata for the reconstituted frame;

verifying the validity of the third frame, and if the third received frame is valid, processing the third frame; and if the third received frame is not valid, verifying the validity of the reconstituted frame and processing the reconstituted frame if it is valid, and ignoring it if the reconstituted frame is not valid.

* * * * *